(12) United States Patent
Giese

(10) Patent No.: US 7,562,868 B2
(45) Date of Patent: Jul. 21, 2009

(54) IMAGING APPARATUS WITH MEDIA SUPPLY SYSTEM EMPLOYING VIBRATION FOR MEDIA SEPARATION

(75) Inventor: Troy A. Giese, North Hugo, MN (US)

(73) Assignee: Carestream Health, Inc., Rochester, NY (US)

( * ) Notice: Subject to any disclaimer, the term of this patent is extended or adjusted under 35 U.S.C. 154(b) by 430 days.

(21) Appl. No.: 11/196,832

(22) Filed: Aug. 3, 2005

(65) Prior Publication Data

US 2007/0029718 A1    Feb. 8, 2007

(51) Int. Cl.
 B65H 3/34    (2006.01)
(52) U.S. Cl. ......................................... 271/104; 271/90
(58) Field of Classification Search .................. 271/90, 271/104, 105, 106
See application file for complete search history.

(56) References Cited

U.S. PATENT DOCUMENTS

| 3,545,741 | A | | 12/1970 | Porth |
| 3,994,488 | A | | 11/1976 | Takenaka et al. |
| 4,585,222 | A | | 4/1986 | Nishibori et al. |
| 4,806,071 | A | * | 2/1989 | Sartorio ...................... 414/801 |
| 4,892,298 | A | * | 1/1990 | Walton et al. ............... 271/18.3 |
| 5,154,406 | A | * | 10/1992 | Bauer .......................... 271/11 |
| 5,181,707 | A | * | 1/1993 | Takei et al. ................... 271/20 |
| 5,350,166 | A | | 9/1994 | Shimizu et al. |
| 5,653,575 | A | * | 8/1997 | Park et al. ................... 414/797 |
| 5,876,031 | A | | 3/1999 | Ohkoda et al. |
| 6,139,005 | A | | 10/2000 | Nelson et al. |
| 6,260,842 | B1 | | 7/2001 | Nelson et al. |
| 6,468,025 | B1 | * | 10/2002 | Stumpf et al. ............... 414/797 |
| 6,508,465 | B1 | * | 1/2003 | Endo ....................... 271/265.01 |
| 6,776,097 | B2 | * | 8/2004 | Takeda ........................ 101/477 |
| 6,883,796 | B2 | | 4/2005 | Nelson |
| 7,044,056 | B2 | * | 5/2006 | Miyoshi ...................... 101/477 |
| 2004/0065221 | A1 | * | 4/2004 | Takeda ........................ 101/477 |
| 2004/0169325 | A1 | | 9/2004 | Nelson |
| 2004/0169330 | A1 | | 9/2004 | Nelson et al. |

FOREIGN PATENT DOCUMENTS

| JP | 2158530 | 6/1990 |
| JP | 3259832 | 11/1991 |
| JP | 4358636 | 12/1992 |
| JP | 2000177864 | 6/2000 |
| JP | 2001072265 | 3/2001 |

* cited by examiner

*Primary Examiner*—Patrick H Mackey
*Assistant Examiner*—Michael C McCullough

(57) ABSTRACT

A media supply system (40) suitable for use in an imaging apparatus (30) to remove sheets of imaging media from a stack of one or more sheets of imaging media. Media supply system (40) includes a pickup assembly (50) and an actuator system (52). Pickup assembly (50) is moveable between at least a first position and a second position, wherein at least a portion of the pickup assembly is configured to selectively engage a first sheet of imaging media of the stack when the pickup assembly is in the first position. Actuator system (52) is selectively coupled to pickup assembly (50) and is configured to move pickup assembly (50) between at least the first position and the second position and to vibrate at least the portion of the pickup assembly engaging the first sheet of imaging media at a desired frequency after moving the pickup assembly from the first position, wherein the desired frequency is based on characteristics of the sheets of imaging media.

3 Claims, 11 Drawing Sheets

IMAGING APPARATUS WITH MEDIA SUPPLY SYSTEM EMPLOYING VIBRATION FOR MEDIA SEPARATION

FIELD OF THE INVENTION

The present invention relates generally to an imaging apparatus, and more specifically to an imaging apparatus having a media supply system employing vibration for media separation.

BACKGROUND OF THE INVENTION

Light sensitive photothermographic film is used in many applications ranging from a standard photocopying apparatus to graphic arts and/or medical imaging systems. For example, laser imagers are widely used in the medical imaging field to produce visual representations on film of digital image data generated by magnetic resonance (MR), computer tomography (CT) or other types of scanners. Laser imagers typically include some type of film supply system, a film exposure system, a film processing system, and a transport system that moves film from the supply system along a transport path through the laser imager. Sheets of unexposed film are typically stacked within a standardized cartridge or magazine which is inserted into the laser imager. The supply system generally includes a mechanism for removing and providing sheets of unexposed film from the cartridge to the transport system for subsequent transport through the exposure and processing systems and delivery of a developed image to a dispensing area for access by a user.

When removing sheets of film from the cartridge, it is important that the supply system remove and provide only one sheet of film at a time from the cartridge to the transport system. Providing more than one sheet of film to the transport system can cause film jams along the transport path and result in poorly and/or improperly developed images requiring re-development, both of which result in lost productivity and potential damage to the imager. Unfortunately, due to a variety of factors such as, for example, static electricity, film coatings, and vacuum-like effects between sheets, sheets of photothermographic film tend to cling or stick together when placed in a stack, making removal of individual sheets of film from the stack difficult. In fact, when trying to lift/remove a top sheet of film from a stack, the attraction between the sheets of film is so strong that sometimes the entire stack clings to and is lifted with the top sheet.

One type of film supply system includes a rotatable pickup head that employs suction cups to engage the top sheet of film of the stack. After the suction cups create a vacuum seal with the top sheet of film, the pickup head is rotated back and forth between one or more positions to flex the film so as to separate the top sheet of film from the other sheets of the stack. While this system is generally effective at removing the bulk of the lower sheets of the stack from the upper sheets of the stack, it is not always effective at separating the upper sheets of film from another, such as the one or more sheets immediately below the top sheet in the stack. An example of such a system is described by U.S. Patent Publication No. 2004/0169325 A1 to Nelson, filed on Feb. 28, 2003, which is assigned to the same assignee as the present invention, and is herein incorporated by reference.

As such, there is a need for an improved system for separating individual sheets of film from a stack of film of a film source of an imaging apparatus.

SUMMARY OF THE INVENTION

In one embodiment, the present invention provides a media supply system suitable for use in an imaging apparatus to remove sheets of imaging media from a stack of one or more sheets of imaging media. The media supply system includes a pickup assembly and an actuator system. The pickup assembly is moveable between at least a first position and a second position, wherein at least a portion of the pickup assembly is configured to selectively engage a first sheet of imaging media of the stack when the pickup assembly is in the first position. The actuator system is selectively coupled to the pickup assembly and configured to move the pickup assembly between at least the first position and the second position and to vibrate at least the portion of the pickup assembly engaging the first sheet of imaging media at a desired frequency after moving the pickup assembly from the first position, wherein the desired frequency is based on characteristics of the sheets of imaging media.

In one embodiment, the desired frequency is substantially equal to a natural frequency of the first sheet of imaging media. In one embodiment, the desired frequency is based on a natural frequency of the first sheet of imaging media and adjacent sheets of imaging media from the stack clinging to the first sheet of imaging media. In one embodiment, the desired frequency is approximately equal to 13.3 hertz.

By vibrating at least the portion of the pickup assembly engaging the top sheet of film of the stack at a frequency substantially equal to a natural frequency of sheet(s) of film lifted from the stack, the film supply system utilizes the effects of resonance to amplify the vibration of the sheet(s) of film. By amplifying the vibration of the sheet(s) of film in this fashion, the likelihood is increased that the first sheet of film engaged by the pickup assembly will be separated from other sheets of film of film of the stack so that only one sheet of film will be provided to the media transport system. As such, a film supply system employing vibration in accordance with the present invention reduces and/or substantially eliminates problems associated with double/multiple film feeds to the media transport system.

DETAILED DESCRIPTION OF THE INVENTION

Figure 1:
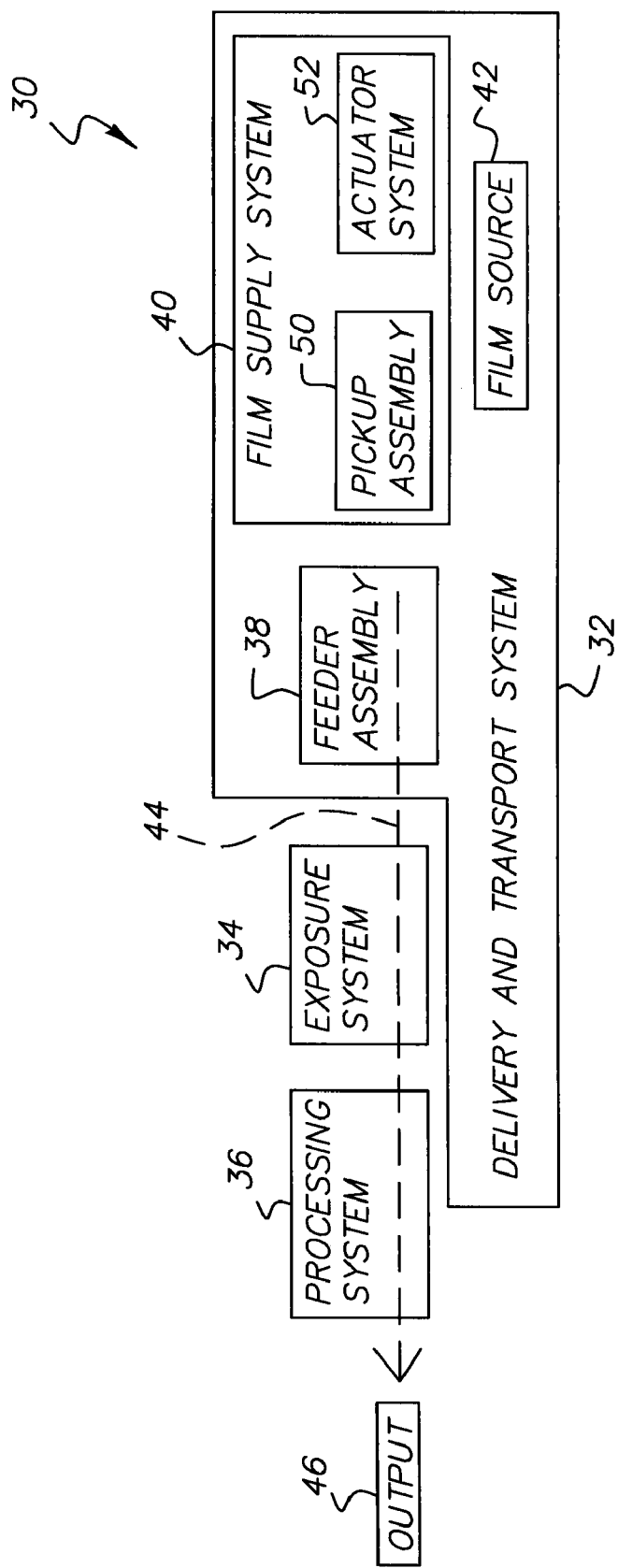
FIG. 1 is a block diagram illustrating generally an imaging apparatus employing a film supply system in accordance with the present invention.

FIG. 1 is a block diagram illustrating generally an imaging apparatus 30 employing a film supply system in accordance with the present invention that utilizes vibration to separate a sheet of film from other sheets of film of a film source. Imaging apparatus 30 includes a film delivery and transport system 32, an exposure system 34, and a processing system 36, with film delivery and transport system 32 further including a feeder assembly 38 and a film supply system 40 in accordance with the present invention. Film delivery and transport system 32 is adapted to receive a film source 42 comprising a stack of unexposed sheets of photosensitive imaging media or film within a cartridge or magazine which is removable from imaging apparatus 30.

During operation, film supply system 40, as will be described in greater detail below, is configured to remove and provide a sheet of unexposed film from film source 42 to feeder assembly 38. Feeder assembly 38, in-turn, delivers the sheet of unexposed film from film supply system 40 to a transport path 44 (indicated by the heavy dashed line). Delivery and transport system 32 transports the unexposed film along transport path 44 to exposure system 34 which exposes a desired photographic image on the film based on image data (e.g. digital or analog) to form a latent image of the desired photographic image on the film. In one embodiment, exposure system 34 comprises a laser imager.

Delivery and transport system 32 moves the exposed film along transport path 44 from exposure system 34 to processing system 36 which develops the exposed film. In one embodiment, processing system 36 comprises a thermal processor, such as a drum-type processor, which heats the exposed film to thermally develop the latent image. The developed film is cooled and moved by delivery and transport system 32 along transport path 44 to an output area 46, such as an output tray, for access by a user. An example of an imaging apparatus similar to that described generally above by imaging apparatus 30 and suitable to be configured for use with film supply system 40 in accordance with the present invention is described by U.S. Pat. No. 6,007,971 to Star et al., which is herein incorporated by reference.

In one embodiment, as illustrated, film supply system 40 includes a pickup assembly 50 and an actuator system 52. Pickup assembly 50 is moveable between at least a contact position and home position, and at least a portion of pickup assembly 50 is configured to selectively engage a first sheet of film from the stack of film of film source 42 when pickup assembly 50 is in the contact position. Actuator system 52 is selectively coupled to pickup assembly 50 and is configured to move pickup assembly 50 between at least the contact position and the home position. In one embodiment, pickup assembly 50 is generally maintained at the home position. To deliver a sheet of film from film source 42 to feeder assembly 38, actuator system 52 moves pickup assembly 50 from the home position to the contact position. After pickup assembly 50 engages the first sheet of film from the stack, actuator system 52 is configured to return pickup assembly 50 to the home position where the first sheet of film is delivered to feeder assembly 38. Feeder assembly 38, in turn, delivers the first sheet of film to transport path 44 for subsequent exposure and processing.

However, as described earlier, sheets of stacked film tend to cling or adhere to one another for a variety of reasons (e.g. static electricity, film coatings). As a result, after pickup assembly 50 engages the first sheet of film from the stack of film of film source 42 and is moved toward the home position by actuator system 52, one or more sheets of film may cling to the first sheet of film and be lifted from the film stack along with the first sheet of film by pickup assembly 50. Delivering multiple sheets of film to feeder assembly 38 can cause various undesirable results such as, for example, film jams in delivery and transport system 32 and poor image development.

In one embodiment, after pickup assembly 50 engages the first sheet of film of the stack, actuator system 52 is configured to vibrate at least the portion of pickup assembly 50 engaging the first sheet of film at a desired frequency for a desired time period to separate other sheets of film of the stack from the first sheet of film so that only the first sheet of film is lifted from the stack and delivered to feed assembly 38. In one embodiment, the desired frequency is based on characteristics associated with the sheets of film. In one embodiment, the desired frequency is based on a natural frequency of the sheet(s) of film lifted from the stack of film of film source 42 by pickup assembly 50.

Like nearly all objects, a sheet of imaging media or film has a natural frequency. An object's natural frequency is the frequency at which an object tends to freely vibrate when struck or somehow disturbed. If an object is vibrated with a force varying at the natural frequency of the object, the object will begin to resonate and the vibrations will rapidly amplify. Based on the above, it would be advantageous to take advantage of effects of resonance in amplifying vibrations so as to be better able to separate the first sheet of film from other sheets of the stack. As such, in one embodiment, the desired frequency is based on a natural frequency associated with the sheets of film. In one embodiment, the desired frequency at which actuator system 52 vibrates at least the portion of pickup assembly 50 engaging the first sheet of film is substantially equal to a natural frequency of the first sheet of film of the stack.

The natural frequency of a sheet of film is dependent on a variety of factors such as, for example, the length of the sheet, the width of the sheet, and the density of the film. However, the primary factor influencing the natural frequency of a sheet of film is its thickness. In fact, the natural frequency of a sheet of film tends to increase generally linearly with its thickness. This characteristic extends to several sheets film which are clinging together, where the several sheets of film act as a single sheet of film having an effective frequency based, at least in a part, on a sum of the thicknesses of each of the several sheets of film. For example, the effective natural frequency of two sheets of film having a same thickness which are clinging together is approximately twice as high as the natural frequency of either of the sheets standing alone.

However, the exact number of sheets of film clinging to the first sheet of film may not be known. Also, as a vibration operation is carried out by actuator system 52, the effective natural frequency of the several sheets of film will change as clinging sheets of film are separated from the first sheet of film. As such, in one embodiment, actuator system 52 varies the desired frequency over a range of frequencies when pickup up a sheet of film from film source 42.

In one embodiment, actuator system 52 varies the desired frequency over a range of frequencies beginning at an upper end of the frequency range and finishing at a lower end of the frequency range. In one embodiment, the upper end of the frequency range is substantially equal to the effective natural frequency of a maximum number of sheets expected to be initially lifted from film source 42 (i.e. the first sheet of film of the stack and sheets clinging to it). In one embodiment, the lower end of the frequency range is substantially equal to the natural frequency of a single sheet of film of the stack.

By vibrating at least the portion of pickup assembly 50 engaging the top sheet of film of the stack at a frequency substantially equal to a natural frequency of the sheet(s) of film lifted from film cartridge 42, film supply system 40 according to the present invention utilizes the effects of resonance to amplify the vibration of the sheet(s) of film. By amplifying the vibration of the sheet(s) of film in this fashion, film supply system 40 according to the present invention increases the likelihood that the top sheet of film engaged by pickup assembly 50 will be separated from other sheets of film of film cartridge 42 so that only one sheet of film will be provided to feeder assembly 38 of film delivery and transport system 32. As such, film supply system 40 employing vibration in accordance with the present invention reduces and/or substantially eliminates problems associated with double/multiple film feeds to delivery and transport system 32.

Figure 2:
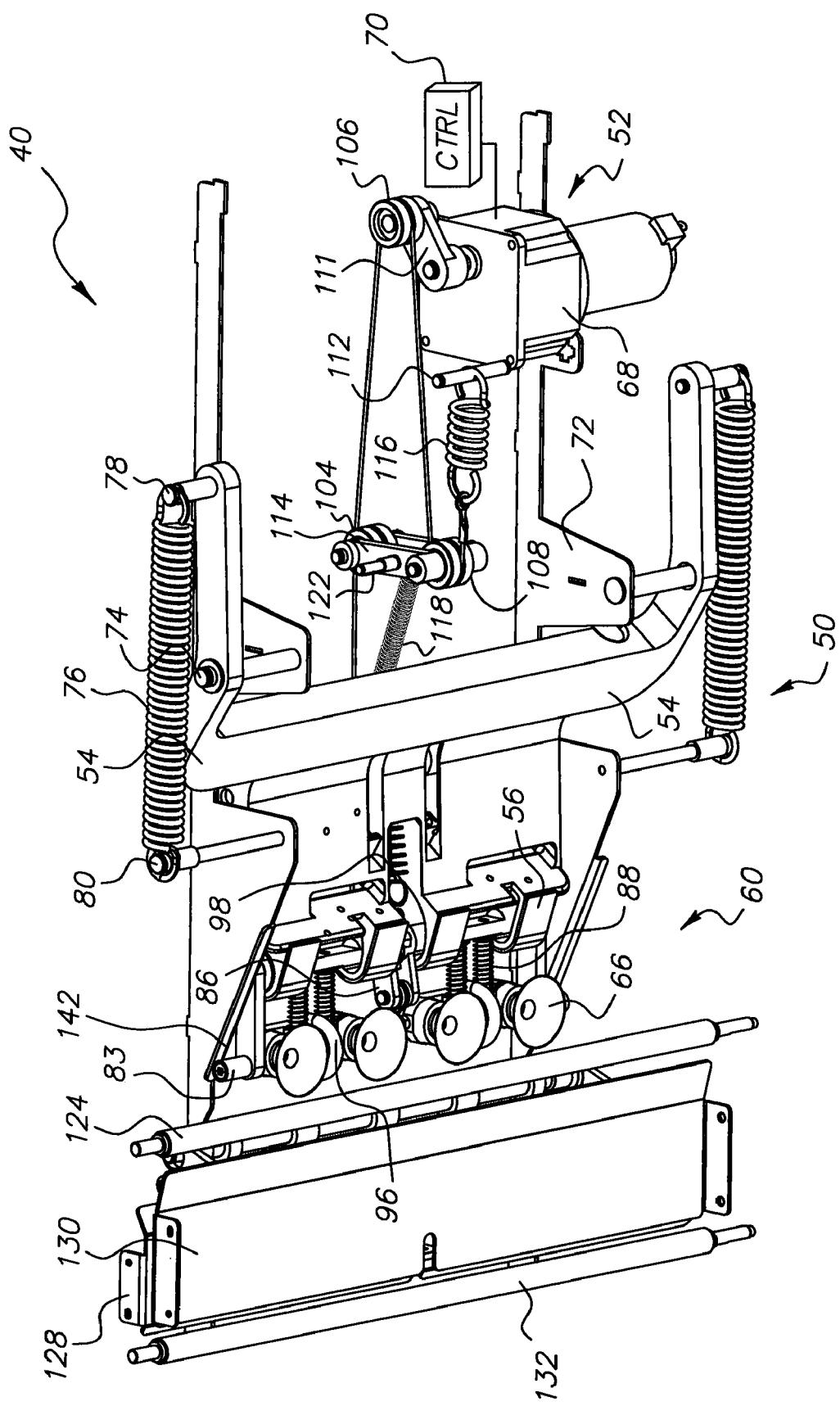
FIG. 2 is an isometric view of a film supply system according to the present invention.

FIGS. 2 through 11 below describe and illustrate one embodiment of film supply system 40 according to the present invention. FIG. 2 is an isometric view of film supply system 40 including pickup assembly 50 and actuator system 52. Pickup assembly 50 includes a heel mechanism 54, a plurality of heel pads 56, and a pickup head 60 pivotally attached to heel mechanism 54, with pickup head 60 including a cup pivot shaft 62, a pair of cup carriages 64, and two pairs of suction cups 66. Actuator system 52 includes a dc gear motor 68 and a controller 70. Heel mechanism 54 is pivotally attached to a pickup frame 72 via two heel pins 74. A pair of heel springs 76 each have one end attached to one of a pair of arms 78 on heel mechanism 54 and the other end to a one of a pair of spring pins 80 mounted to pickup frame 72. Heel mechanism 54 is actuated by dc gear motor 68 as directed by controller 70.

Figure 3:
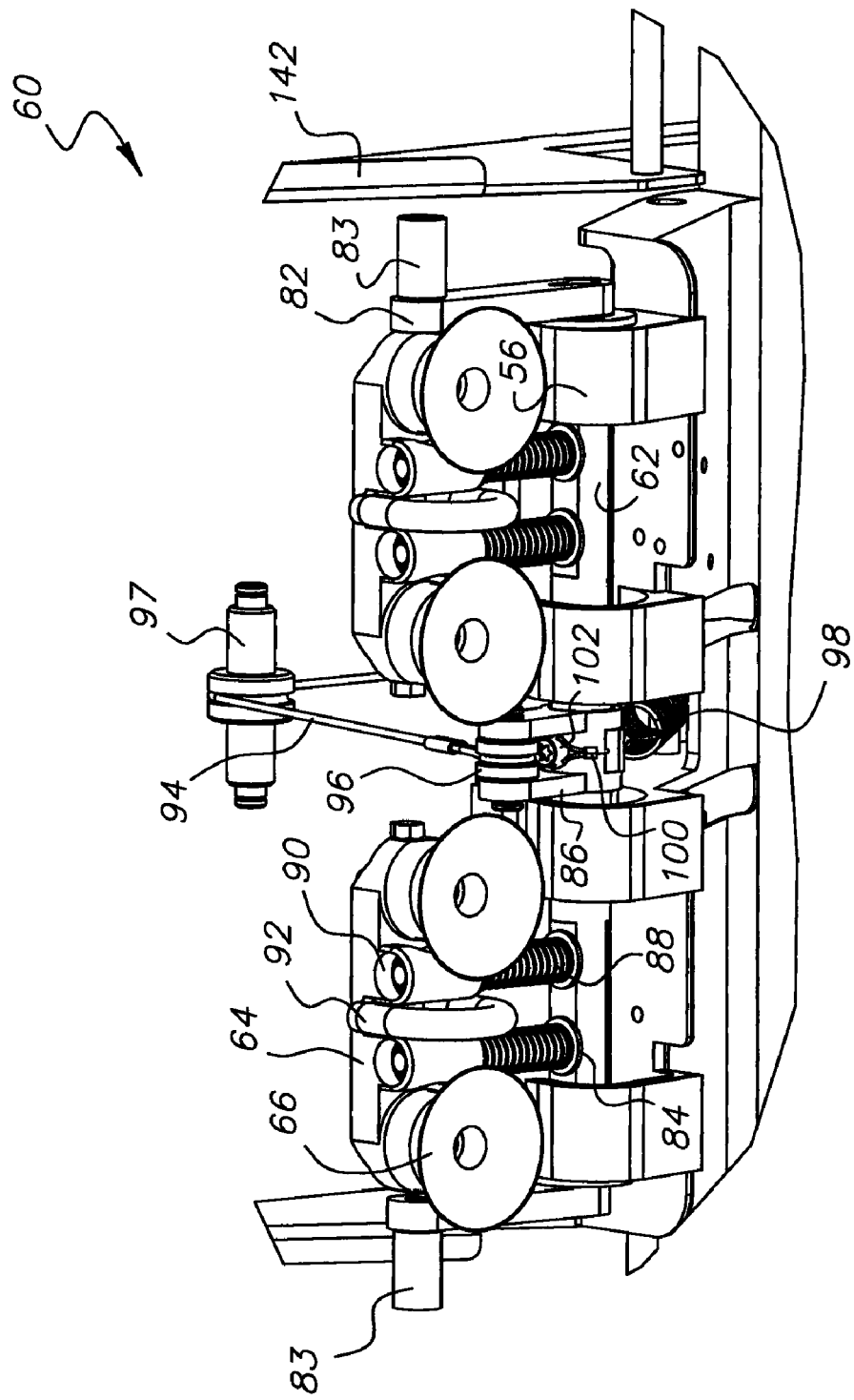
FIG. 3 is an isometric view of a portion of the film supply system 40 of FIG. 2.

FIG. 3 is an isometric view of a portion of film supply system 40 of FIG. 2. As illustrated, cup pivot shaft 62 is pivotally attached to a front section of heel mechanism 54. A pair of pivot arms 82, four carriage pins 84, and a cable arm 86 are rigidly attached to cup pivot shaft 62. A pair of pivot rollers 83 are rotatably coupled to pivot arms 82. Cup carriages 64 slide up and down on carriage pins 84 and are outwardly biased away from cup pivot shaft 62 by four carriage springs 88. One pair of suction cups 66 and a silicone loop 92 are attached to each cup carriage 64. Suction cups 66 are connect to a vacuum pump and solenoid valve with silicone tubing (not shown). Preferably, all suction cups 66 are routed through the same line so that when the vacuum is released by the solenoid valve, the vacuum is released to all cups at once. Additionally, if the vacuum seal is broken at any one of the suction cups, the vacuum will be released to all suction cups 66.

One end of a drive cable 94 loops around a cable pulley 96 which is pinned to an end of cable arm 86. Drive cable 94 loops around a drive pulley 97 and travels back toward dc gear motor 68. One end of a cup pivot spring 98 is attached to one end of a cup pivot cable 100 and other end is attached to heel mechanism 54 via a pin 101. The other end of cup pivot cable 100 is attached to cable arm screw 102 which locks cable arm 86 to cup pivot shaft 62.

Figure 4:
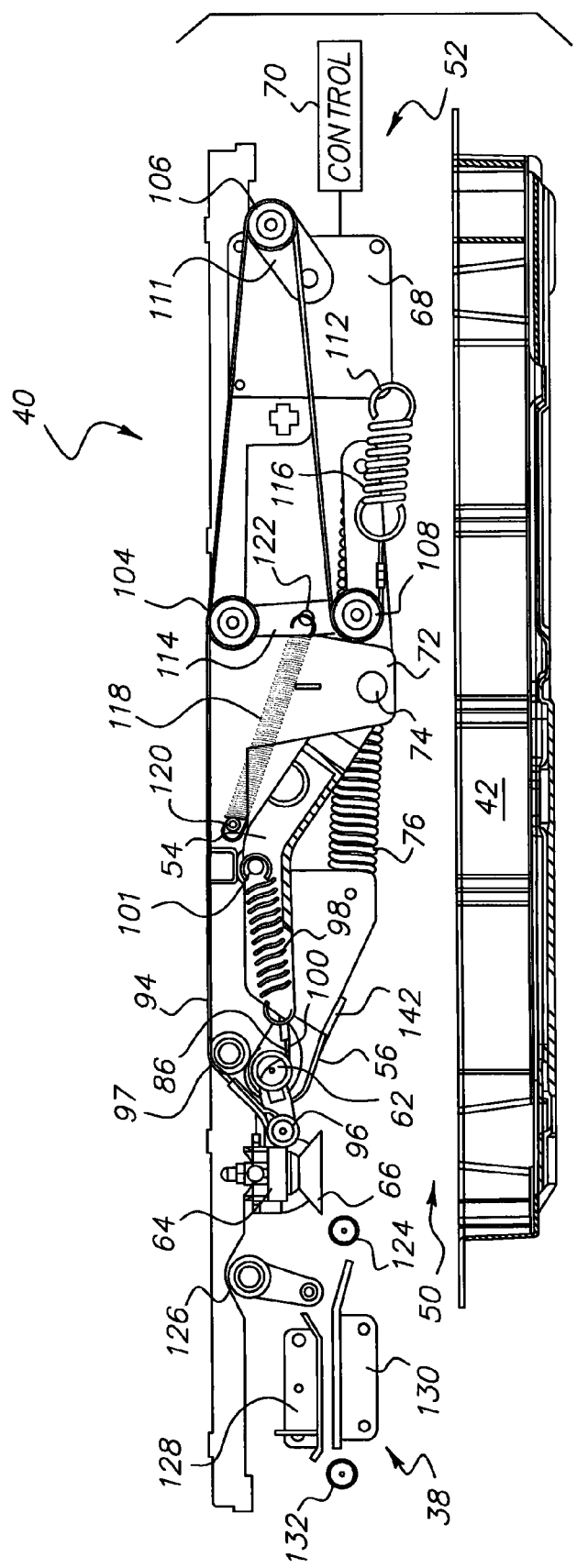
FIG. 4 is a side view of the film supply system of FIG. 2 in a home position.

FIG. 4 is a side view of film supply system 40 of FIG. 2 illustrating pickup assembly 50 in a "home" position. As shown, drive cable 94 loops over a first idler pulley 104, around a motor drive pulley 106, back around a second idler pulley 108, and attaches to one end of a drive cable spring 116. Motor drive pulley 106 is rotatably coupled to one end of a drive link 111. The other end of drive link 111 is selectively coupled to the shaft of dc gear motor 68 and is rotatable in clockwise and counter-clockwise directions as directed by controller 70. The other end of the drive cable spring 116 attaches to a pin 112 which is fixed to pickup frame 72. Second idler pulley 108 is pinned to one end of an idler link 114, wherein idler link 114 pivots relative to pickup frame 72 at the axis of first idler pulley 104. Idler link 114 is biased clockwise, away from drive cable spring 116 with an idler spring 118 attached to pickup frame 72 via a pin 120 and to idler link 114 via a pin 122. Idler link 114, along with first and second idler pulleys 104 and 108, is configured to maintain tension on drive cable 94 and prevent it from disengaging from any of the pulleys.

An example pickup operation of film supply system 40 is described and illustrated below with reference to FIGS. 2-11. FIG. 4 is a side view of film supply system 40 illustrating pickup assembly 50 in what is referred to as the "home" position. The home position is where heel pads 56 and suction cups 66 are at their highest points relative to film cartridge 42, which as illustrated, is positioned below pickup assembly 50. A home sensor (not shown) mounted to heel mechanism 54 engages a home sensor flag (not shown) at the top of pickup frame 72 to indicate when pickup assembly 50 is in the home position.

Portions of feeder assembly 38 are also illustrated, including a drive roller 124, a pivotally-mounted idler roller 126, and a pair of film guides 128 and 130. A roller 132 forming a portion of transport path 44 is also illustrated.

Figure 5:
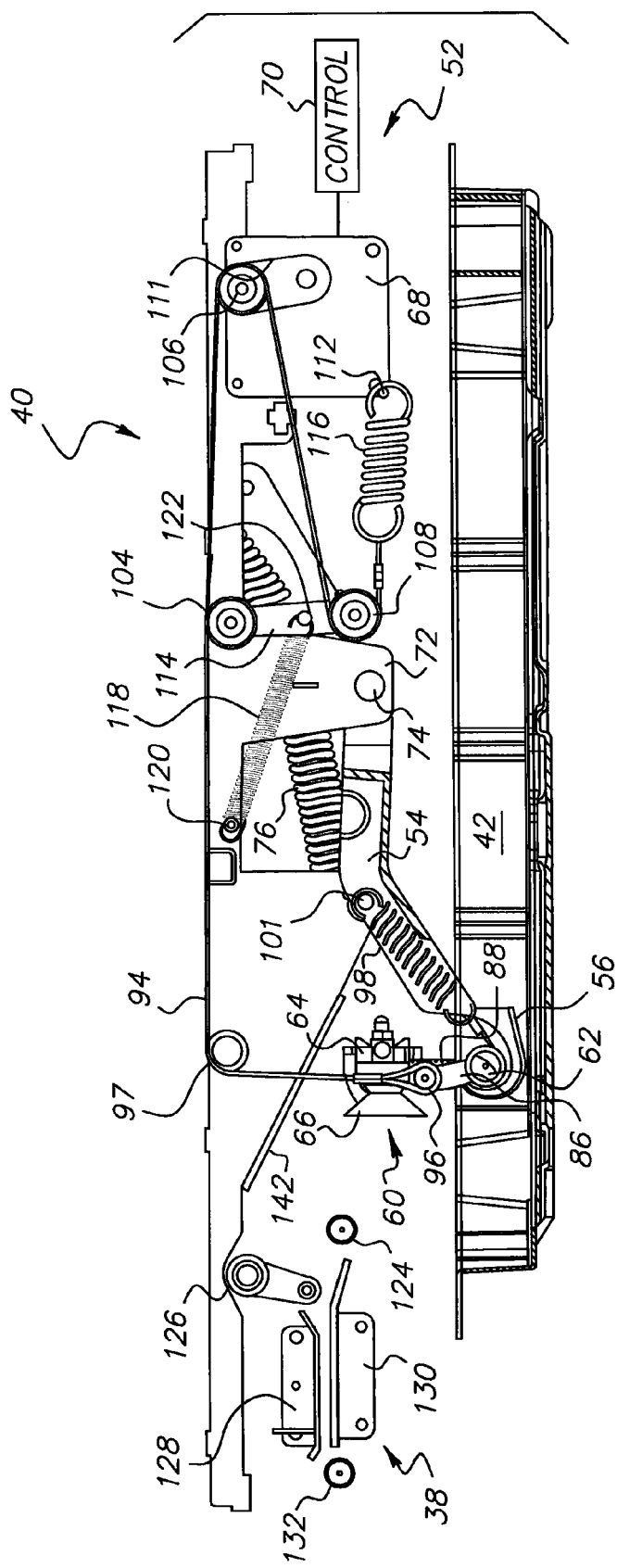
FIG. 5 is a side view of the film supply system of FIG. 2 in a film contact position.

FIG. 5 is a side view of film supply system 40 illustrating pickup assembly 50 in a "film contact" position. In FIG. 5, controller 70 has caused dc gear motor 68 to turn in a counterclockwise, which in-turn causes drive link 111 to rotate in a counterclockwise direction and effectively feeds out drive cable 94 causing heel mechanism 54 to rotate counterclockwise about heel pins 74 until heel pads 56 contact the top sheet of film in film cartridge 42. FIG. 5 illustrates film cartridge as being nearly empty (i.e. having only one sheet of film) so that heel pads 56 are nearly in contact with a bottom of film cartridge 42.

As heel mechanism 54 rotates down onto film in the film cartridge 42, arms 78 on heel mechanism 54 lift upwards so that the resulting moment arm length between the axis of heel springs 76 and heel pins 74 steadily increases. This increases the magnitude of the resulting force of heel pads 56 against the film when in contact with the film. Preferably, the downward force against the film is at a maximum at the bottom of film cartridge 42 and is within a range of 10-15 lbs total.

As pickup assembly 50 travels down from the home position (as shown in FIG. 4) to the film contact, position (as shown in FIG. 5), cup carriages 64 and suction cups 66 are in a nearly vertical position (i.e. at 90 deg relative the film in film cartridge 42). Although cup pivot spring 98 and cup pivot cable 100 wrap around cable arm 86 and create a moment about the axis of cup pivot shaft 62 that bias's cup carriages 64 towards a horizontal position (i.e. substantially parallel with the film in film cartridge 42), the preferred 10 to 15 lb. force on drive cable 94 from heel springs 76 creates a counteracting moment about the axis of cup pivot shaft 62 that is proportional to the length of cable arm 86 and keeps cup carriages 64 in the nearly vertical position until heel pads 56 contact the film.

Figure 6:
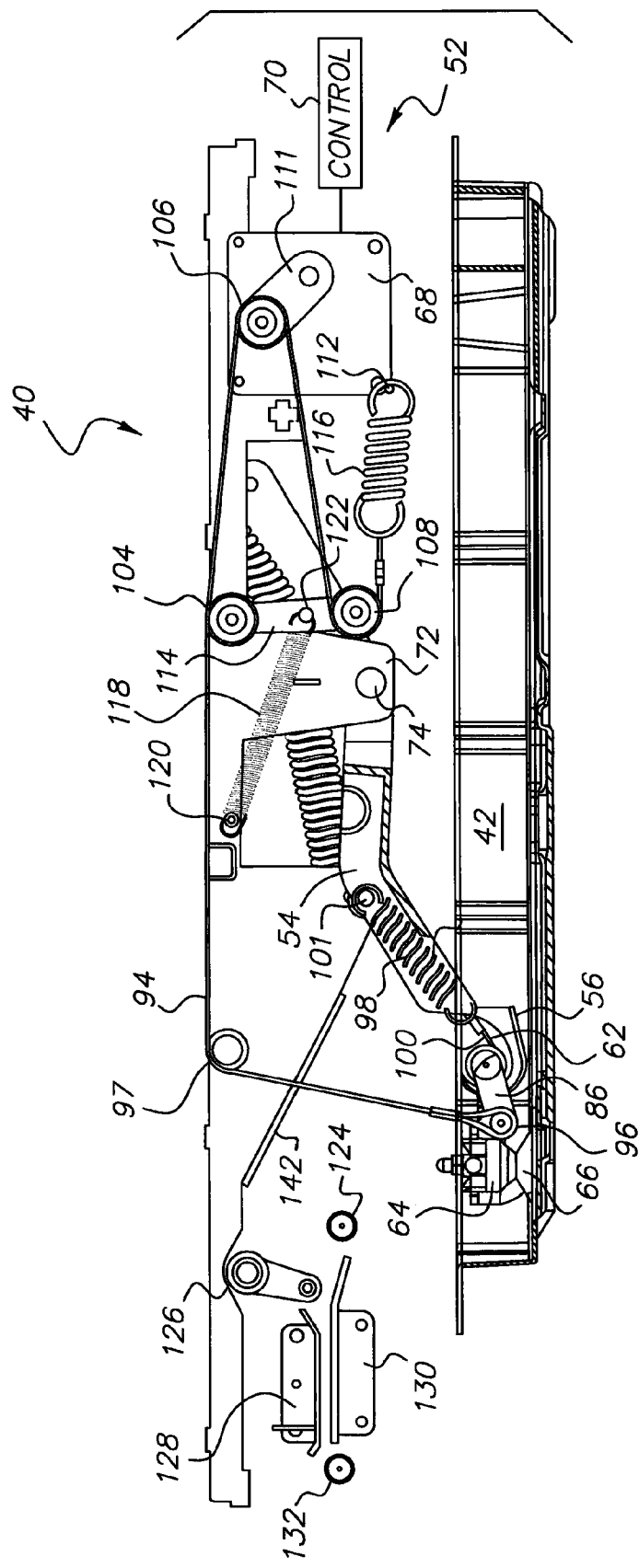
FIG. 6 is a side view of the film supply system of FIG. 2 in a cups engaged position.

FIG. 6 is a side view of film supply system 40 illustrating pickup assembly 50 in a "cups engaged" position. As illustrated, once heel pads 56 make contact with the film in film cartridge 42, heel mechanism 54 is no longer able to rotate and heel springs 76 can no longer influence the position of the cup carriages 64 and rotation of cup pivot shaft 62 is governed by cup pivot spring 98 which rotates cup carriages 64 in a counterclockwise direction (i.e. relative to the position of cup carriages 64 illustrated by FIG. 5). Controller 70 causes dc gear motor 68 to rotate drive link 111 in a counterclockwise direction, thereby feeding out more of drive cable 94 which causes cup carriages 64 to rotate counterclockwise until suction cups 66 plant down onto the top sheet of film in film cartridge 42. This position is referred to as the "cups engaged" position.

Cable arm 86 is shaped such that the counteracting moment about the axis of cup pivot shaft 62 is at a maximum in the cups engaged position. This rotational moment creates a force that plants suction cups 66 against and helps to create a vacuum seal with a surface of a top sheet of film in film cartridge 42. As will be described later, one parameter that must be taken into account when configuring pickup assembly 50 for engaging a sheet of film is the suction cup depth (SCD), which is defined as the distance between a leading edge of the film and the center of the planted suction cups.

Figure 7:
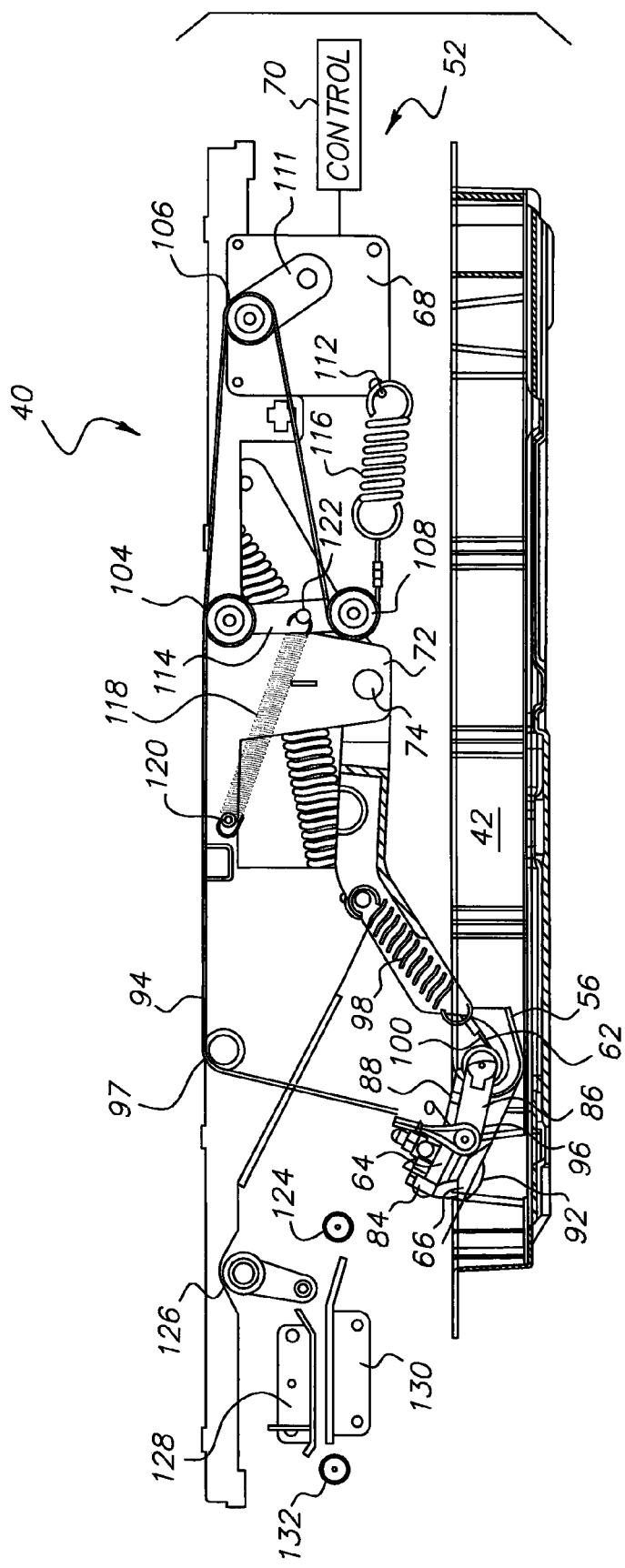
FIG. 7 is a side view of the film supply system of FIG. 2 in a pump position.

FIG. 7 is a side view of film supply system 40 illustrating pickup assembly 50 in a "pump" position. As illustrated above by FIG. 6, once suction cups 66 are planted onto the film, a vacuum seal is made between suction cups 66 and the film by the previously described (but not illustrated) vacuum pump and solenoid valve. At this point, controller 70 reverses the direction of dc gear motor 68 so that drive link 111 rotates in a clockwise direction and causes motor drive pulley 106 to begin retracting drive cable 94. As drive cable 94 retracts and pulls upwards on cable pulley 96, cup carriages 64 rotate in a clockwise direction and lift from the stack of film in film cartridge 42. This position, as illustrated by FIG. 7, is referred to as the "pump" position.

In one embodiment, controller 70 is configured to drive dc gear motor 68 back and forth between clockwise and counterclockwise directions so as to move, or pump, pickup assembly 50 back and forth several times between the cups engaged position and the pump position. Moving the pickup assembly back and forth in this fashion separates the top sheet(s) of film from the bulk of sheets of film of the film pack which may be clinging to the top sheet. In one embodiment, controller 70 drives dc gear motor 68 so that pickup assembly 50 is moved between the cups engaged position and the pump position from one to three times. This back and forth movement of pickup head 60 is critical because if cup carriages 64 rotate further than the pump position with a large number of sheets of film clinging to the top sheet, the force required to bend the sheets of film could cause the heel pads 56 to lift off the film and cause one or more sheets of film to "kick" forward and maybe partially out of film cartridge 42.

It has been discovered that, ideally, no more than 5 sheets of film should be left on the stack lifted by pickup head 60 in order to prevent the heel mechanism 54 from lifting when rotating the cup carriages 64 beyond the pump position. It has also been discovered that narrow width film sizes (e.g., 8×10 inch, and 10×12 inch) need more cycles between the cups engaged position and the pump position to separate the upper sheets of film from the bulk of sheets of the film pack held by film cartridge 42.

Silicone loops 92, which are mounted to cup carriages 64 (see also FIG. 3), aid in separating of sheets of film clinging to the top sheet of film. When the upper sheets of film are lifted upwards and away from film cartridge 42, silicone loops 92 press downward on the film creating a wave along the leading edge of the film. This wave helps to separate the sheets of film by increasing the relative motion between the sheets of film.

Figure 8:
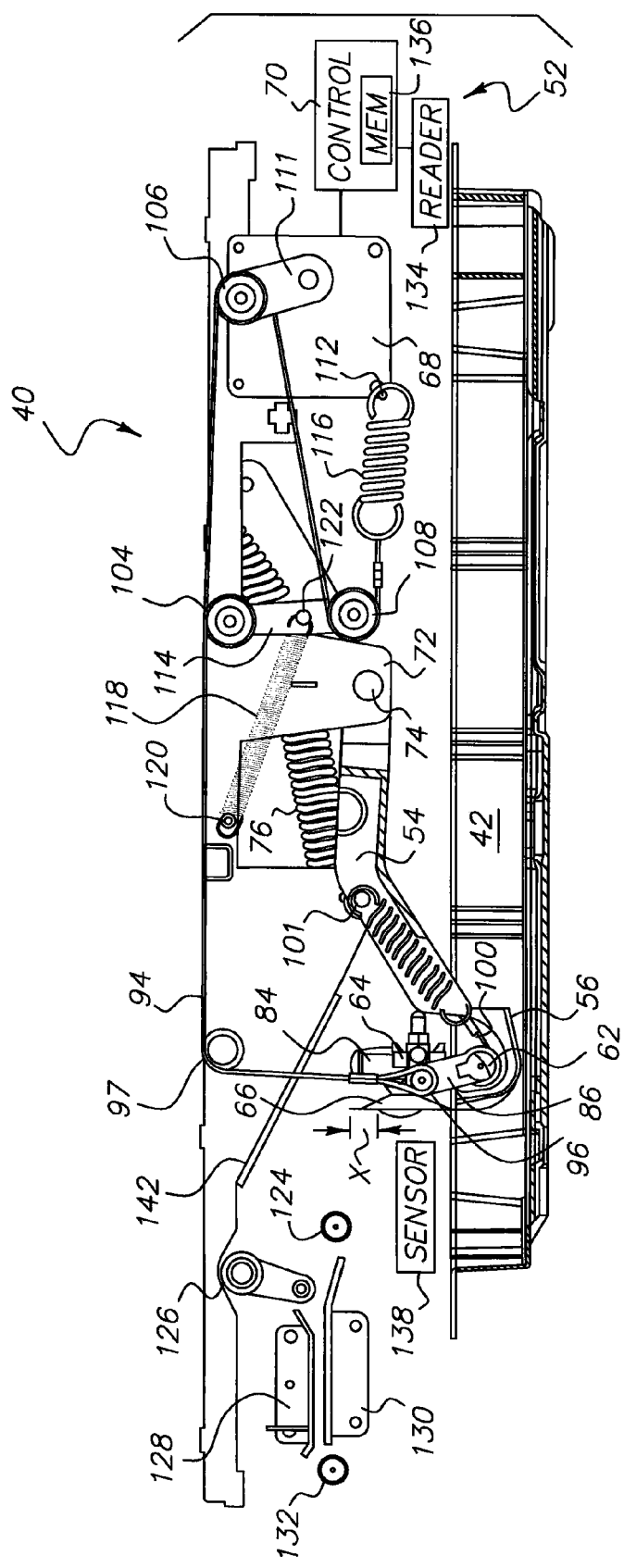
FIG. 8 is a side view of the film supply system of FIG. 2 in a maximum bend position.

FIG. 8 is a side view of film supply system 40 illustrating pickup assembly 50 in a "maximum bend" position. After completing the one-to-three pump operations, as described above with respect to FIG. 7, controller 70 causes dc gear motor 68 to continue to rotate in a clockwise direction causing pickup head 60 to continue rotating in a clockwise direction until cup carriages 64 are in an approximately vertical position relative to film cartridge 42. This position is referred to as the "maximum bend" position. At this position, the controller 70 stops driving dc gear motor 68 so that film lifted by suction cups 66 of pickup head 60 is held at approximately a 90 degree bend.

As the pickup head 60 rotates from the cups engaged position to the maximum bend position, suction cups 66, which are vacuum sealed to the surface of the top sheet of film, must slide downwards on carriage pins 84 toward cup pivot shaft 62. The downward sliding motion of suction cups 66 accounts for the radius of curvature of the film as the film bends. If suction cups 66 were prevented from sliding, the film would tear. The distance of movement of cup carriages 64 along carriage pins 84 is illustrated as dimension "x" in FIG. 8. In one embodiment, the movement of cup carriages 64 as pickup head 60 rotates from the cups engaged position to the maximum bend position is approximately 25 mm.

After reaching the maximum bend position, controller 70 repeatedly drives dc gear motor 68 back and forth between a counterclockwise and clockwise direction at a frequency substantially equal to the natural frequency of a single sheet of film from film cartridge 42. The back and forth movement of dc gear motor 68, via drive link 111, causes motor drive pulley 106 to extend and retract drive cable 94 at a desired frequency which, in turn, causes pickup head 60 to vibrate substantially at the desired frequency. In one embodiment, the desired frequency is substantially equal to the natural frequency of the single sheet of film. In one embodiment, the desired frequency is substantially equal to 13.3 Hz.

In one embodiment, since more than one sheet of film may be lifted to the maximum bend position by pickup head 60 (as described above with respect to FIG. 1), controller 70 drives dc gear motor 68 back and forth between a counterclockwise and clockwise direction over a desired range of frequencies. In one embodiment, the desired range of frequencies has an upper value of 66.5 Hz and lower value of 13.3 Hz.

In one embodiment, controller 70 vibrates pickup head 60 at the desired frequency for a desired time period. In one embodiment, the desired time period is substantially equal to one second.

In an alternate embodiment, a pump position is not employed, and pickup head 60 is rotated directly from the cups engaged positions (as illustrated by FIG. 6) to the max bend position (as illustrated below with respect to FIG. 8). In such an embodiment, pickup head 60 is not moved back and forth between the pump position and the cups engaged position. Instead, controller 70 is configured to drive dc gear motor 68 such that pickup head 60 is vibrated at the desired frequency after the vacuum seal is created between suction cups 66 and the top sheet of film and as pickup head 60 is rotated from the cups engaged position to the maximum bend position.

In one embodiment, in a fashion similar to that described above, controller 70 drives dc gear motor 68 so that pickup head 60 is vibrated over a desired range of frequencies after the vacuum seal is created between suction cups 66 and the top sheet of film and as pickup head 60 is rotated from the cups engaged position to the maximum bend position. In one embodiment, the desired frequency range has a lower value substantially equal to a single sheet of film and an upper value substantially equal to the effective natural frequency of a stack of film having a number of sheets equal to a maximum number of sheets contained within film cartridge 42.

In one embodiment, as illustrated by FIG. 8, film supply system 40 includes a reader 134 configured to read parameters associated with sheets of film contained in film cartridge 42 from indicating means on film cartridge 42 and/or on the film itself. In one embodiment, reader 134 includes a bar code scanner to read processing parameters affixed to either the individual sheets of film or to the film cartridge in the form of a bar code. In one embodiment, reader 134 includes a radio frequency (RF) receiver/transmitter configured to read processing parameter affixed to either the individual sheets of film or to the film cartridge in the form of an RF tag device.

Reader 134 provides the parameters read from the sheets of film and/or film cartridge 42 to controller 70. The parameters may include, for example, the type of film, the length and width of the film, and the thickness of the film. In one embodiment, controller 70 vibrates pickup head 60 at a desired frequency based on the processing parameters received from reader 134. In one embodiment, based on the type and size of film indicated by the processing parameter received from reader 134, controller 70 references a look-up table stored in a memory 136 to determine a desired frequency for vibrating pickup head 60.

In one embodiment, film supply system 40 includes a sensor 138 positioned and configured to determine the number of sheets initially lifted from film cartridge 42 (i.e. the top sheet and an initial number of sheets clinging to the top sheet) by pickup head 60 and provides an indication of the number of sheets to controller 70. In one embodiment, controller 70 vibrates pickup head 60 at a desired frequency based on the number of sheets initially lifted from film cartridge 42. In one embodiment, controller 70 determines an effective natural frequency at which to vibrate several sheets of film lifted by pickup head 60 based on the parameters retrieved from memory 136 according to the parameters received from reader 134 and on the number of sheets indicated by sensor 138.

Figure 9:
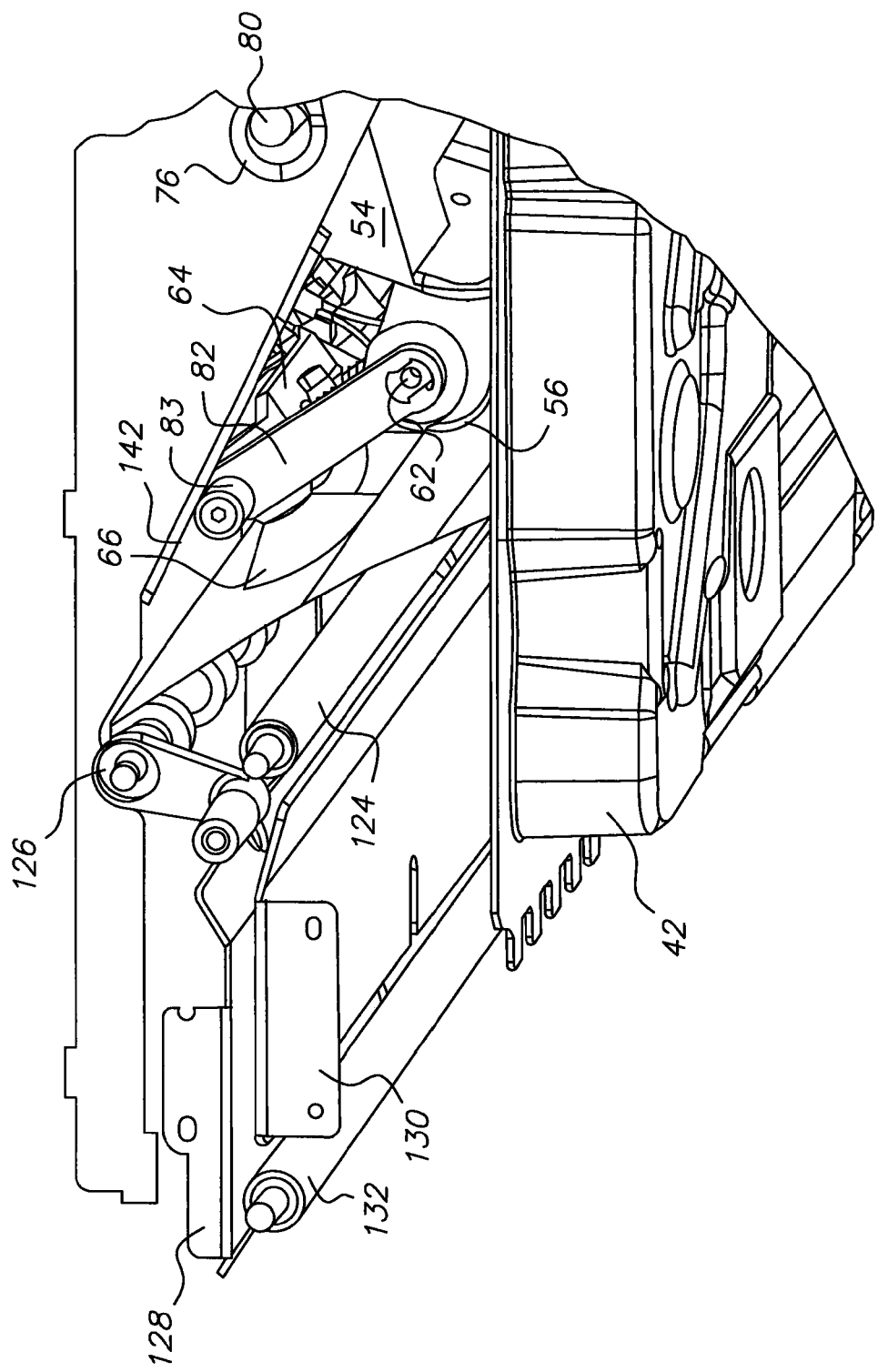
FIG. 9 is an isometric view of the film supply system of FIG. 2.

FIG. 9 shows a further isometric view of film supply system 40 in accordance with the present invention.

Figure 10:
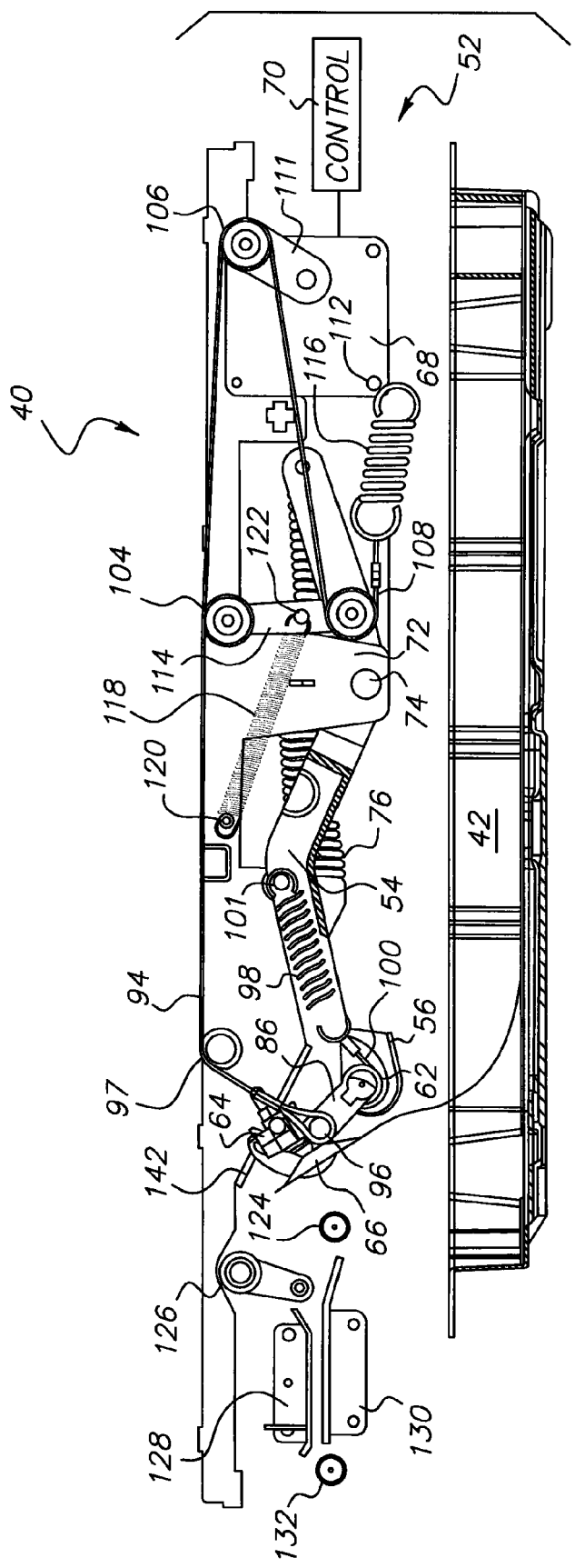
FIG. 10 is a side view of the film supply system of FIG. 2 in a lift position.

FIG. 10 is a side view of film supply system 40 illustrating pickup assembly 50 in a "lift" position. After vibrating pickup head 60 at the desired frequency for a desired time period, controller 70 drives dc gear motor 68 in a clockwise direction so as to retract drive cable 94 and lift pickup assembly 50 from contact with film in film cartridge 42. As drive cable 94 is retracted, pickup assembly 50 leaves the maximum bend position, and help pads 56 of heel mechanism 54 lift from the top sheet of film. At this point, the top sheet of film must be successfully separated by the vibrating process (only one sheet attached to cups), or either multiple sheets will be provided to feeder assembly 38 or one or more sheets of film may be "kicked" forward and potentially out of film cartridge 42.

As controller 70 causes dc gear motor 68 to lift pickup assembly 50 by retracting drive cable 94, pivot rollers 83 attached to pivot arms 82 (see FIG. 3) contact an angled shelf 142 on pickup frame 72. As controller 70 causes dc gear motor 68 to continue retracting drive cable 94, pickup head 60 rotates in a counter clockwise direction about cup pivot shaft 62 and pivot rollers 83 track along angled shelf 142 until pickup assembly 50 reaches the home position (as described below with respect to FIG. 11), at which point pickup head 60 is back to a horizontal position relative to film cartridge 42. This movement has the effect of moving the leading edge 144 of the film up and over drive roller 124 and then forward so as to be positioned between drive roller 124 and pivotally-mounted idler roller 126 of feeder assembly 38.

Figure 11:
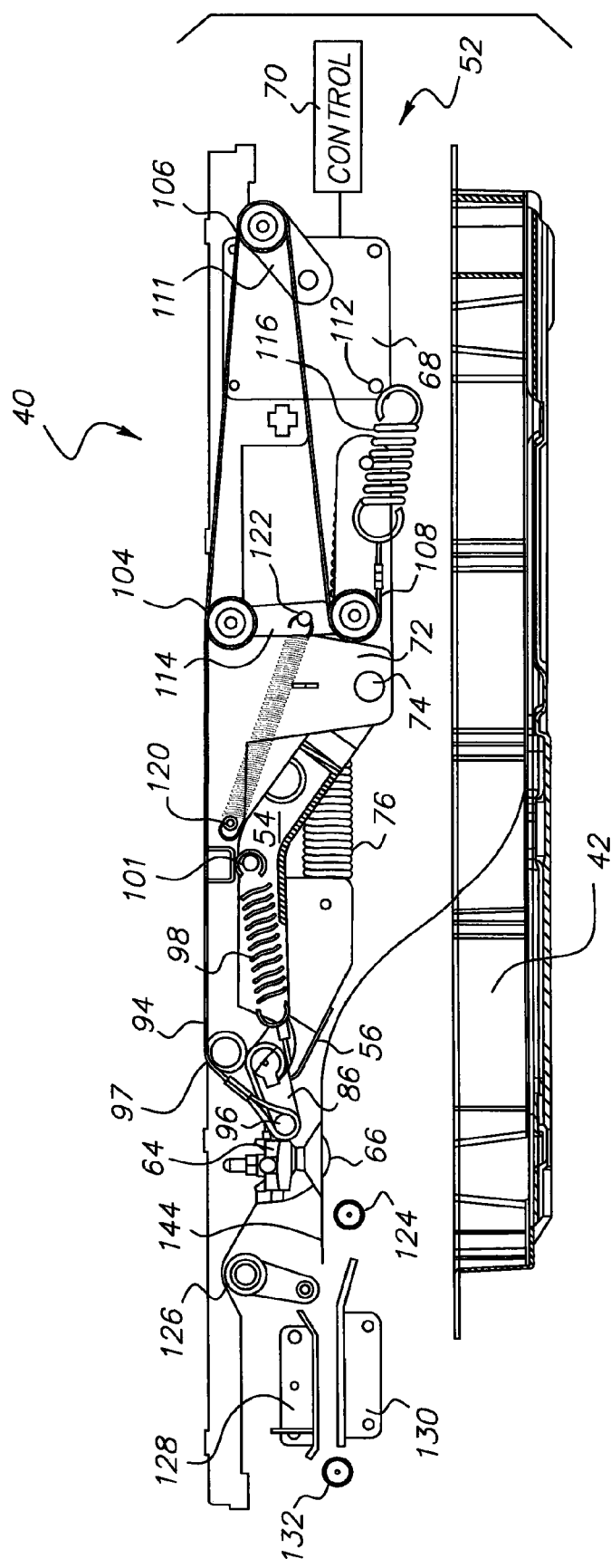
FIG. 11 is a side view of the film supply system of FIG. 2 in the home position after picking up a sheet of film.

FIG. 11 is a side view of film supply system 40 illustrating pickup assembly 50 in the home position after picking up the top sheet of film from film cartridge 42. In the home position, pickup head 60 is in a horizontal position relative to film cartridge 42 with the leading edge 144 of the sheet of film positioned between the open nip formed by drive roller 124 and pivotally-mounted idler roller 126. At this point, idler roller 126 closes onto drive roller 124. When the leading edge 144 of the film is secured by the closed nip formed by driver roller 124 and idler roller 126, the solenoid valve (not shown) is energized and the vacuum between the film and suction cups 66 is released. Once the vacuum is released, feeder assembly 38 drives drive roller 124 so that the sheet of film is transferred to roller 132 of transport path 44 via the pair of film guides 128 and 130 for subsequent movement through imaging apparatus 30.

The invention has been described in detail with particular reference to certain preferred embodiments thereof, but it will be understood that variations and modifications can be effected within the spirit and scope of the invention.

| PARTS LIST | |
|---|---|
| 30 | Imaging Apparatus |
| 32 | Delivery and Transport System |
| 34 | Exposure System |
| 36 | Processing System |
| 38 | Feeder Assembly |
| 40 | Film Supply System |
| 42 | Film Source |
| 44 | Transport Path |
| 46 | Output Area |
| 50 | Pickup Assembly |
| 52 | Actuator System |
| 54 | Heel Mechanism |
| 56 | Heel Pads |
| 60 | Pickup Head |
| 62 | Cup Pivot Shafts |
| 64 | Cup Carriages |
| 66 | Suction Cups |
| 68 | DC Gear Motor |
| 70 | Controller |
| 72 | Pickup Frame |
| 74 | Heel Pins |
| 76 | Heel Springs |
| 78 | Arms |
| 80 | Spring Pins |
| 82 | Pivot Arms |
| 83 | Pivot Rollers |
| 84 | Carriage Pins |
| 86 | Cable Arm |
| 88 | Carriage Springs |
| 90 | E-rings |
| 92 | Silicon Loops |
| 94 | Drive Cable |
| 96 | Cable Pulley |
| 97 | Drive Pulley |
| 98 | Pivot Spring |
| 100 | Pivot Spring Cable |
| 101 | Pin |
| 102 | Cable Arm Screw |
| 104 | Idler Pulley |
| 106 | Motor Drive Pulley |
| 108 | Idler Pulley |
| 111 | Drive Link |
| 112 | Pin |
| 114 | Idler Link |
| 116 | Drive Cable Spring |

-continued

PARTS LIST

| | | |
|---|---|---|
| 118 | Idler Spring | |
| 120 | Pin | |
| 122 | Pin | |
| 124 | Drive Roller | |
| 126 | Idler Roller | |
| 128 | Film Guide | |
| 130 | Film Guide | |
| 132 | Transport Path Roller | |
| 134 | Reader | |
| 136 | Memory | |
| 138 | Sensor | |
| 142 | Angled Shelf | |
| 144 | Leading Edge of Film | |

What is claimed is:

1. A media supply system suitable for use in an imaging apparatus to remove sheets of imaging media from a stack of one or more sheets of imaging media, the media supply system comprising:

a pickup assembly moveable between at least a first position and a second position, wherein at least a portion of the pickup assembly is configured to selectively engage a first sheet of imaging media of the stack when the pickup assembly is in the first position; and an actuator system selectively coupled to the pickup assembly and configured to move the pickup assembly between at least the first position and the second position and to vibrate at least the portion of the pickup assembly engaging the first sheet of imaging media at a desired frequency after moving the pickup assembly from the first position, wherein the desired frequency is based on characteristics of the sheets of imaging media; and a reader configured to read parameters associated with sheets of imaging media of the stack directly from the sheets of imaging media and/or from a media source containing the stack of imaging media, wherein the actuator system determines the desired frequency based on the parameters read by the reader, wherein the actuator system references a look-up table stored in a memory therein based on the parameters read by the reader to determine the desired frequency.

2. The media supply system of claim 1, wherein the reader comprises a bar code scanner configured to read parameters that are in the form of a bar code associated with the sheets of imaging media.

3. The media supply system of claim 1, wherein the reader comprises a radio frequency transceiver configured to read parameters that in the form of a radio frequency tag associated with the imaging media.

* * * * *